(12) United States Patent
Burtscher

(10) Patent No.: US 11,529,692 B2
(45) Date of Patent: Dec. 20, 2022

(54) DOUBLE-SIDED CUTTING INSERT FOR MILLING

(71) Applicant: Ceratizit Austria Gesellschaft m.b.H., Reutte (AT)

(72) Inventor: Peter Burtscher, Reutte (AT)

(73) Assignee: CERATIZIT Austria Gesellschaft m.b.H., Reutte (AT)

( * ) Notice: Subject to any disclaimer, the term of this patent is extended or adjusted under 35 U.S.C. 154(b) by 0 days.

(21) Appl. No.: 17/626,214

(22) PCT Filed: Jun. 23, 2020

(86) PCT No.: PCT/AT2020/060250
§ 371 (c)(1),
(2) Date: Jan. 11, 2022

(87) PCT Pub. No.: WO2021/003506
PCT Pub. Date: Jan. 14, 2021

(65) Prior Publication Data
US 2022/0203460 A1 Jun. 30, 2022

(30) Foreign Application Priority Data

Jul. 11, 2019 (AT) .................................. GM74/2019

(51) Int. Cl.
*B23C 5/06* (2006.01)
*B23C 5/20* (2006.01)

(52) U.S. Cl.
CPC ............... *B23C 5/06* (2013.01); *B23C 5/202* (2013.01); *B23C 2200/0422* (2013.01);
(Continued)

(58) Field of Classification Search
CPC ... B23C 5/06; B23C 5/202; B23C 2200/0422; B23C 2200/125; B23C 2200/208;
(Continued)

(56) References Cited

U.S. PATENT DOCUMENTS 5,951,214 A 9/1999 Rothballer et al.
6,142,716 A * 11/2000 Jordberg ................. B23C 5/202
407/115
(Continued)

FOREIGN PATENT DOCUMENTS

AT 14282 U1 * 5/2015 ............... B23C 5/06
CH 681211 A5 * 2/1993 ............. B23C 5/207
(Continued)

*Primary Examiner* — Nicole N Ramos
(74) *Attorney, Agent, or Firm* — Laurence A. Greenberg; Werner H. Stemer; Ralph E. Locher

(57) ABSTRACT

A double-sided cutting insert for milling has a first cutting edge formed at a transition from a top side to a circumferential lateral surface and a second cutting edge formed at a transition from a bottom side to the circumferential lateral surface. A reference plane (R) runs normal to an axis of symmetry (S). The cutting edges have main cutting edge portions and face cutting edge portions arranged in alternation, which extend between raised cutting corners and lowered cutting corners. The circumferential lateral surface has face free surfaces, which extend along the face cutting edge portion and which approach the axis of symmetry (S) with increasing distance from the associated face cutting edge portion. The circumferential lateral surface has main free surfaces, which extend along the main cutting edge portion and which move farther away from the axis of symmetry with increasing distance from the associated main cutting edge portion.

20 Claims, 6 Drawing Sheets

(52) U.S. Cl.
CPC .. *B23C 2200/125* (2013.01); *B23C 2200/208* (2013.01); *B23C 2200/243* (2013.01); *B23C 2210/045* (2013.01); *B23C 2210/0457* (2013.01); *B23C 2210/206* (2013.01)

(58) Field of Classification Search
CPC ........ B23C 2200/243; B23C 2210/045; B23C 2210/0457; B23C 2210/206
See application file for complete search history.

(56) References Cited

U.S. PATENT DOCUMENTS

| | | | |
|---|---|---|---|
| 6,203,251 B1 | 3/2001 | Oppelt et al. | |
| 9,022,700 B2 * | 5/2015 | Bhagath | B23C 5/06 407/113 |
| 9,138,815 B2 * | 9/2015 | Jansson | B23C 5/2213 |
| RE45,845 E * | 1/2016 | Men | B23C 5/2213 |
| 9,975,188 B2 * | 5/2018 | Roman | B23C 5/06 |
| 2006/0228179 A1 * | 10/2006 | Alm | B23B 27/145 407/119 |
| 2007/0003384 A1 | 1/2007 | Smilovici et al. | |
| 2010/0150671 A1 * | 6/2010 | Oprasic | B23C 5/2208 407/42 |
| 2013/0129432 A1 * | 5/2013 | Jaeger | B23C 5/2247 407/42 |
| 2013/0156515 A1 * | 6/2013 | Satran | B23C 5/06 407/113 |
| 2014/0199127 A1 | 7/2014 | Imai et al. | |
| 2014/0205387 A1 * | 7/2014 | Norstedt | B23C 5/06 407/35 |
| 2014/0298967 A1 * | 10/2014 | Ishi | B23C 5/109 83/13 |
| 2014/0334890 A1 * | 11/2014 | Takahashi | B23C 5/205 407/40 |
| 2017/0189975 A1 * | 7/2017 | Yamamoto | B23C 5/06 |
| 2017/0282262 A1 * | 10/2017 | Burtscher | B23C 5/202 |
| 2018/0193928 A1 * | 7/2018 | Ishi | B23C 5/109 |
| 2018/0221969 A1 * | 8/2018 | Oprasic | C22C 29/00 |
| 2019/0015911 A1 * | 1/2019 | Hagiwara | B23C 5/202 |

FOREIGN PATENT DOCUMENTS

| | | | |
|---|---|---|---|
| CN | 103894660 A | 7/2014 | |
| DE | 19848045 A1 | 4/2000 | |
| EP | 2818269 A1 | 12/2014 | |
| EP | 2747925 B1 | 10/2015 | |
| EP | 3124152 A1 | 2/2017 | |
| WO | 9520452 A1 | 8/1995 | |
| WO | 2007004206 A1 | 1/2007 | |
| WO | WO-2014081010 A1 * | 5/2014 | ............... B22F 7/06 |

* cited by examiner

DOUBLE-SIDED CUTTING INSERT FOR MILLING

FIELD AND BACKGROUND OF THE INVENTION

The present invention concerns a double-sided cutting insert for milling, and a milling tool with at least one cutting insert arranged thereon.

For machining in particular metallic materials by material removal, often milling tools are used which have a carrier body provided with a cutting insert or a plurality of cutting inserts. The cutting inserts are usually exchangeable, and must be exchanged at more or less regular intervals because of wear. It is known to form the cutting inserts as so-called indexable cutting inserts with a plurality of identically formed cutting edge portions which can be brought successively, one after the other, into an active position by changing the orientation (indexing) of the cutting insert relative to the carrier body of the milling tool, in which position they can remove material from the workpiece to be machined. Here, the respective inactive cutting edge portions do not come into engagement with the workpiece, and can be brought into the active position for example after wear on the previously active cutting edge portion. In this manner, several cutting edge portions can be provided independently of one another, to allow an efficient use of the cutting insert. In the present case, when arranged on the milling tool, the main cutter present in an active cutting position is known as the active main cutter, and the face cutter present in an active cutting position is known as the active face cutter. The respective other main cutters and face cutters, which can be used via indexing, are known as the inactive main cutters or inactive face cutters.

The exchangeable cutting inserts are normally made of a hard, wear-resistant material, such as in particular cemented carbide, Cermet or a cutting ceramic, and may also be provided with a further wear-resistant hard material coating. The carrier body is typically made of a tougher material such as in particular steel, wherein partially for example a tougher hard metal or other materials are used.

To achieve as efficient a use of the cutting insert as possible, it is known to use double-sided cutting inserts which are provided with a cutting edge both at the transition between a top side and a circumferential lateral surface, and also at the transition between a bottom side and the circumferential lateral surface, said cutting edge having a plurality of cutting edge portions which can be used independently of one another.

For face milling in particular, often indexable inserts of the so-called S type (square) are used which have a square base form with four main cutters, running substantially along the sides of a square, per cutting edge. The face cutters are arranged between the adjacent main cutters, adjoining these via raised and lowered cutting corners, and may typically extend at an angle of around 135° relative to the main cutters. In fitted state of the cutting insert in a milling tool, a face cutter is usually arranged substantially perpendicularly to a rotational axis of the milling tool and serves as a face cutter for smoothing the surface. The main cutter adjoining the face cutter on the radial outside relative to the milling tool, via a raised cutting corner, serves primarily as a material-removal cutter.

In order to avoid wear or damage of the cutting edge of the double-sided cutting insert situated at the rear relative to the rotation of the milling tool, the cutting insert must be arranged sloping in the milling tool, such that it is both tilted forward with respect to the axial direction at a negative axial installation angle, in order to be able to protect the inactive face cutter of the other cutting edge situated behind the active face cutter engaging in the workpiece, and also tilted with respect to the radial direction at a negative radial installation angle, in order to protect the inactive main cutter of the other cutting edge situated behind the active main cutter engaging in the workpiece. Great tilting in the axial and/or radial direction can lead to problems both with respect to the effective cutting forces and also in respect to chip formation.

It must be noted that in the present technical field, certain terms such as e.g. "clearance angle", "rake angle" etc. may be defined firstly "nominally" in relation to the cutting insert, and secondly also (by deviation) "effectively" in relation to the installation position of the cutting insert on a milling tool relative to the workpiece. In the context of the present description, nominal angular data are used in of the description of the cutting insert, whereas effective angular data are used in relation to the milling tool with the cutting inserts installed therein.

In particular in milling tools equipped with double-sided cutting inserts, the stability of the milling process is extremely sensitively dependent on the effective raking angles and effective clearance angles achieved, wherein the double-sided form of the cutting insert imposes great restrictions on the freedom of design.

EP 2 747 925 A1 describes a double-sided cutting insert for face milling, and a milling tool for face milling with a plurality of such cutting inserts.

SUMMARY OF THE INVENTION

It is an object of the present invention to provide an improved double-sided cutting insert for milling, and an improved milling tool with at least one such cutting insert, with which a particularly gentle cut and particularly stable milling process can be achieved, in particular in face milling.

This object is achieved by a double-sided cutting insert for milling as claimed. Advantageous refinements are given in the dependent claims.

The double-sided cutting insert for milling comprises: a top side; a bottom side; a circumferential lateral surface; a first cutting edge which is formed at a transition from the top side to the circumferential lateral surface; a second cutting edge which is formed at a transition from the bottom side to the circumferential lateral surface; an axis of symmetry relative to which the cutting insert has a fourfold rotational symmetry; and a reference plane running perpendicularly to the axis of symmetry and dividing the cutting insert into two halves. The first cutting edge and the second cutting edge each comprise: alternately arranged main cutters and face cutters, each extending between raised cutting corners and lowered cutting corners which are closer to the reference plane than the raised cutting corners. The circumferential lateral surface has face clearance surfaces which each extend along the face cutter and which become closer to the axis of symmetry as the distance from the associated face cutter increases. The circumferential lateral surface has main clearance surfaces which each extend along the main cutter and which become further away from the axis of symmetry as the distance from the associated main cutter increases.

Firstly the face clearance surfaces become closer to the axis of symmetry as the distance from the associated face cutter increases, the face clearance surfaces being thus formed with positive nominal face clearance angles; secondly, the main clearance surfaces become further away from the axis of symmetry as the distance from the associated main cutter increases, the main clearance surfaces being thus formed with negative nominal main clearance angles; in combination, this allows an installation position of the double-sided cutting insert in a milling tool for face milling in which installation is possible with a quantitatively relatively small negative axial installation angle, i.e. only a slight negative axial installation angle, and with a quantitatively much greater negative radial installation angle, i.e. a much more strongly negative radial installation angle. This combination allows a very great positive effective axial angle to be provided at the main cutter in the installed state, with which a very gentle raking material-removal behavior is achieved with very good chip discharge. Because of the negative nominal main clearance angle, despite the extreme installation position, a stable cutting wedge is possible at the main cutter and a clearance angle which is optimal for the material to be machined, while the rear inactive main and face cutters are reliably protected against wear.

According to a refinement, the cutting insert has, in a view onto the top side, a substantially square base form with angled corners, wherein the main cutters extend along the main sides of the square base form and the face cutters extend along the angled corners. With this design, an optimized orientation of the active main cutter and active secondary cutter is possible. Preferably, the first cutting edge and the second cutting edge are each formed by four main cutters and four face cutters which are connected together by the raised cutting corners and lowered cutting corners.

According to a refinement, the main cutters, viewed onto the top side or onto the bottom side, each have an internal angle in the range between 130° and 140° with the adjacent face cutters. The internal angle between the main cutter and the face cutter adjoining this via a lowered cutting corner may e.g. be equal to the internal angle between the main cutter and the face cutter adjoining this via a raised cutting corner, or the two internal angles may also be different from one another, wherein in this case the respective internal angle would lie in the range between 130° and 140°. This embodiment achieves a particularly advantageous orientation of the main and face cutters for face milling.

According to a refinement, the face clearance surfaces each extend as a flat surface along the entire face cutter from a raised cutting corner to a lowered cutting corner. In this case, a particularly smoothly machined workpiece surface can be achieved. The face cutters extend from the raised cutting corner to the lowered cutting corner. The face cutters may become closer to the reference plane with a constant fall from the raised cutting corner to the lowered cutting corner.

Preferably, the face cutter, viewed onto the top side, may be formed straight.

According to a refinement, the main clearance surfaces each extend as a flat surface along the entire main cutter from a raised cutting corner to a lowered cutting corner. In this case, a particularly long main cutter, useful for material removal, is possible. The main cutter extends from the raised cutting corner to the lowered cutting corner. In particular, the main cutter may become closer to the reference plane with a constant fall from the raised cutting corner to the lowered cutting corner.

Preferably, the main cutter, viewed onto the top side, may be formed straight.

According to a refinement, the top side and the bottom side are each provided with a main rake surface chamfer adjacent to the main cutters, and with a face rake surface chamfer adjacent to the face cutters. In this way, a particularly robust design of the cutting insert is possible. The main rake surface chamfer and the face rake surface chamfer preferably each have a width (measured perpendicularly to the main cutter or face cutter) in the range from 0.1 to 0.4 mm.

Thus the width of the face rake surface chamfer and the width of the main rake surface chamfer may be preferably at least substantially the same.

According to a refinement, a nominal chamfer angle of the face rake surface chamfer is smaller than a nominal chamfer angle of the main rake surface chamfer. With an installation position at a large negative radial installation angle and a small negative axial installation angle, this design allows both the active main cutter and the active face cutter to be reliably protected, and at the same time the main cutter and face cutter to be optimally matched to the material to be machined. Preferably, the nominal chamfer angle (i.e. measured at the cutting insert) of the face rake surface chamfer is at least 8° smaller than the nominal chamfer angle (measured at the cutting insert) of the main rake surface chamfer. It should be noted that e.g. the nominal chamfer angle of the main rake surface chamfer may be positive, and the nominal chamfer angle of the face rake surface chamfer negative, or for example both may be negative. Particularly preferably, the nominal chamfer angle of the face rake chamfer angle is at least 10° smaller than the nominal chamfer angle of the main rake surface chamfer. Preferably, the nominal chamfer angle of the face rake surface chamfer is at most 20° smaller than the nominal chamfer angle of the main rake surface chamfer.

The object is also achieved by a milling tool as claimed in claim 10. Advantageous refinements are given in the dependent claims.

The milling tool has a base body which has at least one seat for receiving a cutting insert, and at least one cutting insert as claimed in any of the preceding claims arranged on the seat. Using the milling tool, the advantages described above with reference to the double-sided cutting insert are achieved. Preferably, the base body of the milling tool may have a plurality of seats distributed over the circumference of the base body for receiving identical cutting inserts. Here preferably, a plurality of cutting inserts may be attached to the seats. Preferably, the cutting inserts may be attached to the seats with the same orientation. The milling tool may preferably be formed in particular as a face milling tool. The cutting insert is here arranged such that an active face cutter extends substantially perpendicularly to a rotational axis of the milling tool. A slight deviation from a precisely perpendicular arrangement is however possible, in particular the face cutter may be tilted backward slightly in the axial direction, in the direction of the rotational axis of the milling tool.

According to a refinement, the seat has a main support surface for supporting a main contact surface of the cutting insert extending parallel to the reference plane, and the main support surface extends at a negative axial installation angle and a negative radial installation angle, wherein the radial installation angle is at least 10° smaller than the axial installation angle. This means that both the axial installation angle and the radial installation angle are each negative, but the radial installation angle is much more greatly negative than the axial installation angle. The combination of a negative axial installation angle and a much more greatly negative radial installation angle allows a very great positive effective axial angle to be achieved at the main cutter in installed state, with which a very gentle raking material-removal behavior and very good chip discharge can be achieved, and at the same time the rear inactive main cutters and face cutters can be reliably protected. Preferably, the radial installation angle may be at least 15° smaller than the axial installation angle. The radial installation angle is preferably at most 20° smaller than the axial installation angle, so that the cutting insert can be formed with a robust stable form.

Preferably, the axial installation angle may lie in a range from −1° to −5°, preferably in a range from −2° to −4°, so that firstly adequate protection of the inactive main cutters and secondary cutters is achieved, and secondly a very gentle cut is possible.

Preferably, the radial installation angle may lie in a range from −15° to −21°, particularly preferably in a range from −17° to −19°. In this case, installation is possible at a negative axial installation angle which is only very slight in comparison with the radial installation angle, which allows a particularly gentle cut by the main cutter.

According to a refinement, the cutting insert is arranged such that an active main cutter extends at an effective axial angle in the range from 16°-24°, preferably 18°-22°. In this case, a very gentle raking material-removal behavior and very good chip discharge are achieved.

According to a refinement, the cutting insert is arranged on the milling tool such that the effective main clearance angle formed at the active main cutter lies in the range from 8°-12°, and the effective face clearance angle formed at the active face cutter also lies in the range from 8°-12°. In this case, a particularly advantageous chip formation is achieved with simultaneously long service life of the cutting insert.

According to a refinement, the cutting insert is provided with a face rake surface chamfer and with a main rake surface chamfer, and is arranged such that an effective chamfer angle of the face rake surface chamfer and an effective chamfer angle of the main rake surface chamfer are substantially the same size in the installed state. The term "substantially the same size" means that the difference is less than 5°, preferably less than 3°. In this case, a particularly advantageous material-removal behavior is achieved.

Further advantages and practical details of the invention arise from the following description of exemplary embodiments, given with reference to the appended figures.

DETAILED DESCRIPTION OF THE INVENTION

An embodiment is described below with reference to the figures. Firstly, the double-sided cutting insert 1 for milling is described with reference to FIGS. 1 to 6, and then the milling tool 100 with cutting inserts arranged thereon. The cutting insert 1 and the milling tool 100 are configured for face milling.

Figure 1:
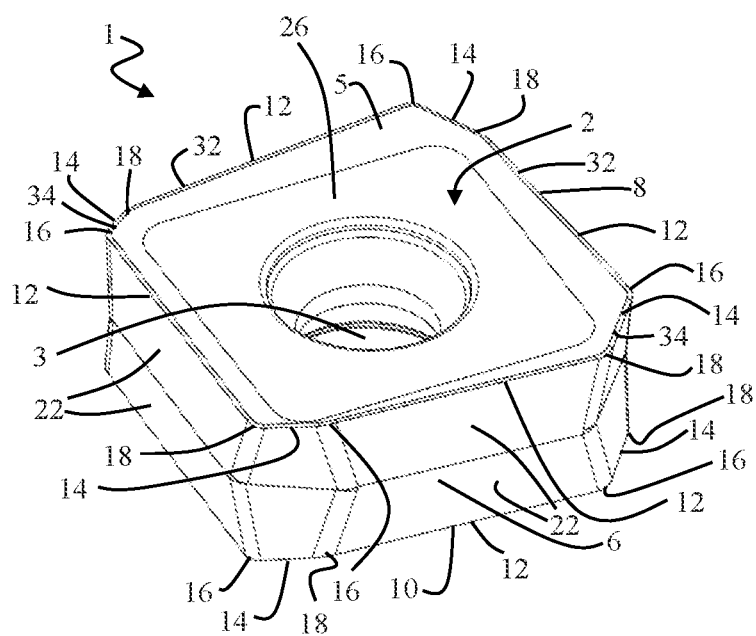
FIG. 1: a schematic, perspective illustration of a double-sided cutting insert according to one embodiment.
Figure 2:
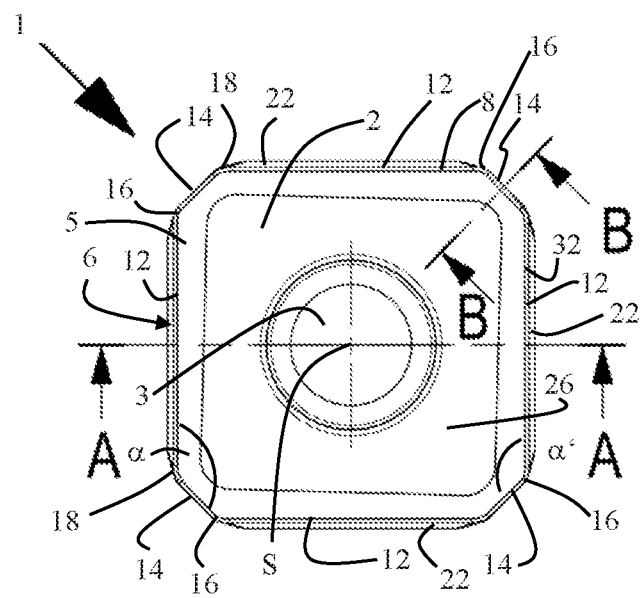
FIG. 2: a schematic top view of the cutting insert from FIG. 1.

As shown in FIG. 1 to FIG. 6, the double-sided cutting insert 1 has a substantially square base form in which the corners have been angled, as shown in particular from the top view illustrated in FIG. 2.

The cutting insert 1 has a top side 2, a bottom side 4 opposite this, and a circumferential lateral surface 6 which extends between the top side 2 and the bottom side 4. At a transition from the top side 2 to the circumferential lateral surface 6, a first cutting edge 8 is formed which, in the embodiment depicted, extends over the entire periphery. In the same way, at the transition from the bottom side 4 to the circumferential lateral surface 6, a second cutting edge 10 is formed which, in the embodiment shown, also extends over the entire periphery.

A passage hole 3 for receiving a fixing bolt, via which the cutting insert 1 may be attached to a seat of a milling tool, extends from the top side 2 to the bottom side 4 along an axis of symmetry S of the cutting insert 1. A reference plane R extends perpendicularly to the axis of symmetry S and divides the cutting insert 1 (virtually) into two identical halves. The cutting insert 1 has a fourfold rotational symmetry with respect to the axis of symmetry S, i.e. it can be transferred into the same form by rotation through a further 90° about the axis of symmetry S in each case. The cutting insert 1 is furthermore spot-symmetrical with respect to the intersection point of the axis of symmetry S with the reference plane R, so that the first cutting edge 8 and the second cutting edge 10 are formed substantially identically to one another.

As evident in particular in FIG. 1 and FIG. 2, the top side 2 and the bottom side 4 are each provided with a main contact surface 26 which extends parallel to the reference plane R. The main contact surface 26 surrounds the passage hole 3 in each case. Between the first cutting edge 8 and the main contact surface 26, the top side 2 is provided with a rake surface 5 which becomes closer to the reference plane R as the distance from the first cutting edge 8 increases. Correspondingly, between the second cutting edge 10 and the main contact surface 26 on the bottom side 4, a rake surface 5 is formed which becomes closer to the reference plane R as the distance from the second cutting edge 10 increases.

The first cutting edge 8 and the second cutting edge 10 each have alternately arranged main cutters 12 and face cutters 14. The main cutters 12 are configured mainly so as to remove the chip during face cutting, and the face cutters 14 serve to smooth the resulting surface. The main cutters 12 extend along the long side edges of the substantially square base form of the cutting insert 1. The face cutters 14 extend along the angled corners of the substantially square base form of the cutting insert 1.

Figure 5:
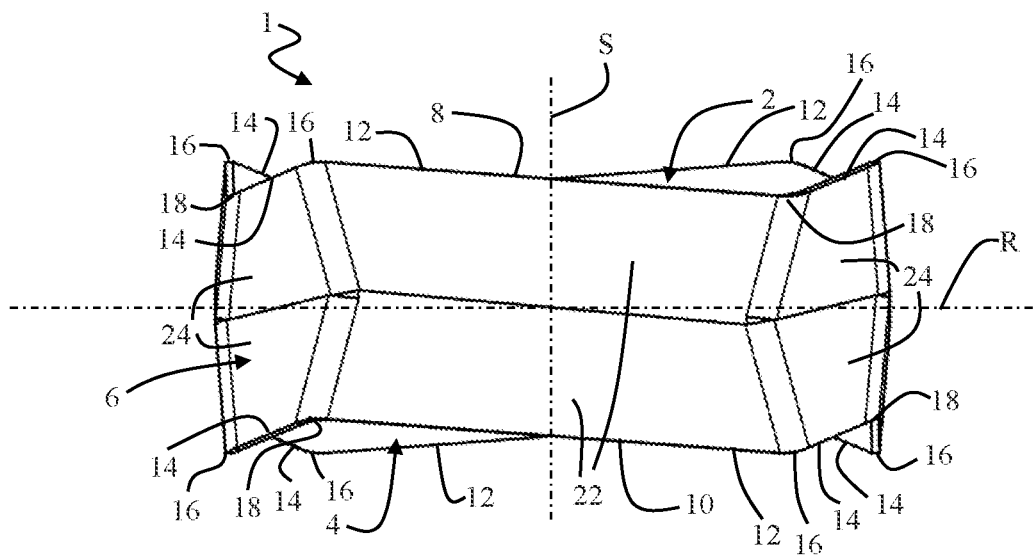
FIG. 5: a schematic, side view of the cutting insert onto main clearance surfaces, viewed perpendicularly to the axis of symmetry of the cutting insert.
Figure 6:
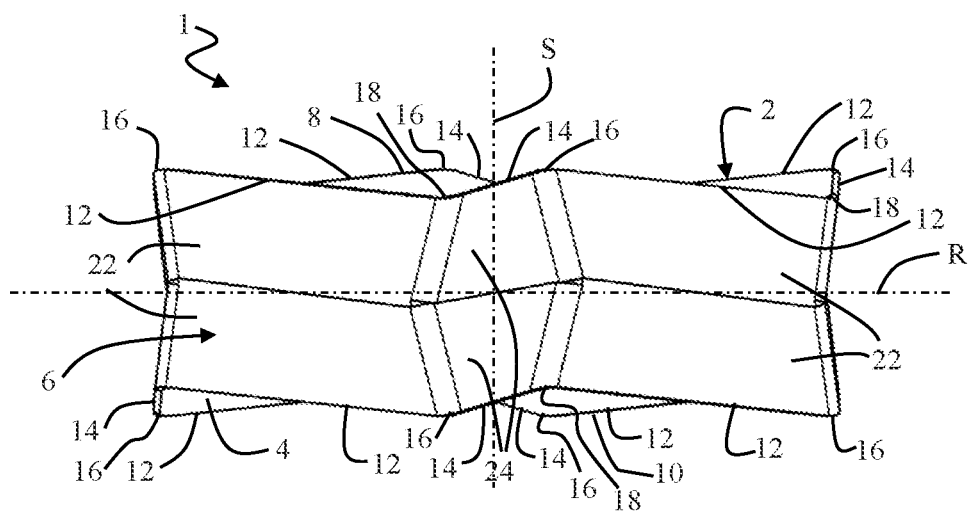
FIG. 6: a schematic, side view of the cutting insert onto secondary clearance faces, viewed perpendicularly to the axis of symmetry of the cutting insert.

As evident in particular from FIG. 5 and FIG. 6, the first cutting edge 8 and the second cutting edge 10 have alternately raised cutting corners 16, which have a greater distance from the reference plane R, and lowered cutting corners 18, which have a smaller distance from the reference plane R. A main cutter 12 in each case extends from a raised cutting corner 16 to a lowered cutting corner 18. A face cutter 14 in each case extends from a lowered cutting corner 18 to a raised cutting corner 16, and via this transforms into the adjacent main cutter 12. A face cutter 14 and the main cutter 12, adjoining this via the raised cutting corner 16, together form a cutting edge portion which may be brought into an active cutting position for face milling, as will be explained in more detail below. The main cutter 12 in each case adjoins, via the lowered cutting corner 18, the face cutter 14 of an adjacent cutting edge portion which can be subsequently used by means of indexing.

Viewed along the axis of symmetry S, a face cutter 14 and the main cutter 12, adjoining this via a raised cutting corner 16, in each case enclose with one another an internal angle α' in the range from 130° to 140°. Viewed along the axis of symmetry S, a main cutter 12 together with the face cutter 14, adjoining this via a lowered cutting corner 18, in each case enclose with one another an internal angle α in the range from 130° to 140°. It should be noted that the internal angles α and α' may e.g. be the same, in particular e.g. may amount to 135°, but may however also be different from one another.

The main cutter 12 extends such that it becomes closer to the reference plane R as the distance from the raised cutting corner 18 increases. The main cutter 12 may here become closer to the reference plane R preferably with a constant fall, as illustrated in FIG. 5 and FIG. 6. In the embodiment shown, the main cutter 12 extends substantially rectilinearly in a view onto the top side 2 or bottom side 4. In the embodiment shown, the main cutter 12 also extends substantially rectilinearly in a side view perpendicularly to the axis of symmetry S. It should however be noted that the main cutter 12 may have a slightly curved form both in top view onto the top side 2 or bottom side 4, and also in a side view.

In the embodiment shown, the face cutter 14 also extends such that it becomes closer to the reference plane R as the distance from the raised cutting corner 16 increases. The face cutter 14 may also become closer to the reference plane R with a preferably constant fall. In the embodiment shown, the face cutter 14 also extends substantially rectilinearly both in top view onto the top side 2 or bottom side 4 and also in a side view perpendicularly to the axis of symmetry S. It should be noted that the face cutter 14 may also have a slightly curved form.

Figure 3:
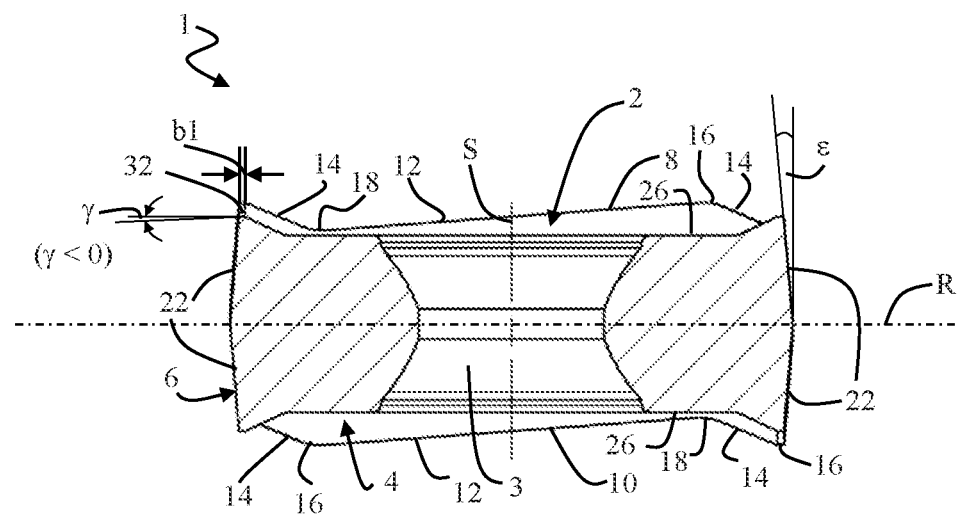
FIG. 3: a sectional illustration along lines A-A in FIG. 2.

As evident in particular from FIG. 1 and FIG. 3, directly adjacent to the main cutter 12, a main rake surface chamfer 32 is formed which serves for targeted reinforcement of the cutting wedge. The main rake surface chamfer 32 has a width b1 (measured perpendicularly to the main cutter) in the range from 0.1 to 0.4 mm. In the embodiment shown, the main rake surface chamfer 32 has a negative nominal chamfer angle γ, as seen in FIG. 3. It should however be noted that a positive nominal chamfer angle is also possible.

Figure 4:
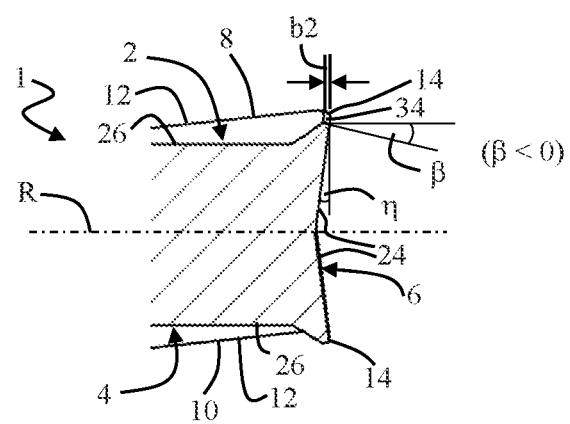
FIG. 4: a sectional illustration along lines B-B in FIG. 2.

As shown in FIG. 1 and FIG. 4, immediately adjacent to the face cutter 14, a face rake surface chamfer 34 is formed. The face rake surface chamfer 34 has a width b2 (measured perpendicularly to the face cutting edge 14) in the range from 0.1 to 0.4 mm. The width of the face rake surface chamfer 34 may in particular correspond e.g. to the width of the main rake surface chamfer 32. The face rake surface chamfer 34 has a negative nominal chamfer angle β, as shown in FIG. 4. The nominal chamfer angle β of the face rake surface chamfer 34 is here smaller than the nominal chamfer angle γ of the main rake surface chamfer 32. In the embodiment shown, the nominal chamfer angle β of the face rake surface chamfer 34 is at least 8° smaller, preferably at least 10° smaller, than the nominal chamfer angle γ of the main rake surface chamfer 32. For example, in one embodiment, the nominal chamfer angle γ of the main rake surface chamfer 32 may amount to approximately −2.5°, and the nominal chamfer angle β of the face rake surface chamfer 34 may be approximately −13°.

Along the main cutters 12, main clearance surfaces 22 are formed in the circumferential lateral surface 6, as shown in particular in FIGS. 1, 5 and 6. In the embodiment shown, the main clearance surfaces 22 are each formed as flat surfaces which extend along the entire associated main cutter 12 from a raised cutting corner 16 to a lowered cutting corner 18. The main clearance surface 22 becomes further away from the axis of symmetry S as the distance from the associated main cutter 12 increases. In other words, the main clearance surface 22 extends at a negative nominal main clearance angle E, as shown in FIG. 3. A main clearance surface 22, which is associated with a main cutter 12 of the first cutting edge 8, extends approximately up to the reference plane R, where it transforms into a main clearance surface 22 which is associated with a main cutter 12 of the second cutting edge 10. Because of the negative nominal main clearance angle ε, the adjacent main clearance surfaces 22 of the first cutting edge 8 and the second cutting edge 10 enclose with one another an external angle >180°, as evident in FIG. 3. Although in the embodiment shown, the main clearance surfaces 22 each extend approximately up to the reference plane R where they transform into the clearance main surfaces 22 of the opposite cutting edge, it is e.g. also possible that one or more further surfaces are provided in-between in the circumferential lateral surface 6.

Along the face cutters 14, face clearance surfaces 24 are formed in the circumferential lateral surface 6, as shown in particular in FIGS. 1, 5 and 6. In the embodiment shown, the face clearance surfaces 24 are each formed as flat surfaces which extend along the entire associated face cutter 14 from a raised cutting corner 16 to a lowered cutting corner 18. The face clearance surface 24 becomes closer to the axis of symmetry S as the distance from the associated face cutter 14 increases. In other words, the face clearance surface 24 extends at a positive nominal face clearance angle η, as shown in FIG. 4. A face clearance surface 24, associated with a face cutter 14 of the first cutting edge 8, extends approximately up to the reference plane R, where it transforms into a face clearance surface 24 associated with a face cutter 14 of the second cutting edge 10. Because of the positive nominal face clearance angle η, the adjacent face clearance surfaces 24 of the first cutting edge 8 and the second cutting edge 10 here enclose with one another an obtuse external angle, i.e. an angle <180°, as shown in FIG. 4. Although in the embodiment shown, the face clearance surfaces 24 each extend approximately up to the reference plane R where they transform into the face clearance surfaces 24 of the opposite cutting edge, it is e.g. also possible that one or more further faces are provided in-between in the circumferential lateral surface 6.

Because of the described embodiment of the main clearance surfaces 22 and face clearance surfaces 24, the circumferential lateral surface 6 is thus formed with an outward convex curve in the region of the main cutters 12 and main clearance faces 22, whereas the circumferential lateral surface 6 is formed within inward concave curve in the region of the face cutters 14 and face clearance surfaces 24.

A milling tool 100 for face milling is described below with reference to FIG. 7 to FIG. 11, wherein firstly a base body 101 of the milling tool 100 is described with reference to FIG. 7 and FIG. 8.

The milling tool 100 has a base body 101 which has a first end 105 with an interface for connection to a spindle of a machining tool. At an opposite second end, the base body 101 is formed with a plurality of seats 102 for receiving the double-sided cutting inserts 1 described above. Although in the figures, as an example, a base body 101 is shown which is provided with a total of seven such seats 102, other embodiments are also possible in which the base body 101 has more than seven or fewer than seven seats 102. The seats 102 are distributed over the circumference of the base body 101 and are designed to receive the double-sided cutting inserts 1 each with the same orientation, as will be described in more detail below.

Figure 7:
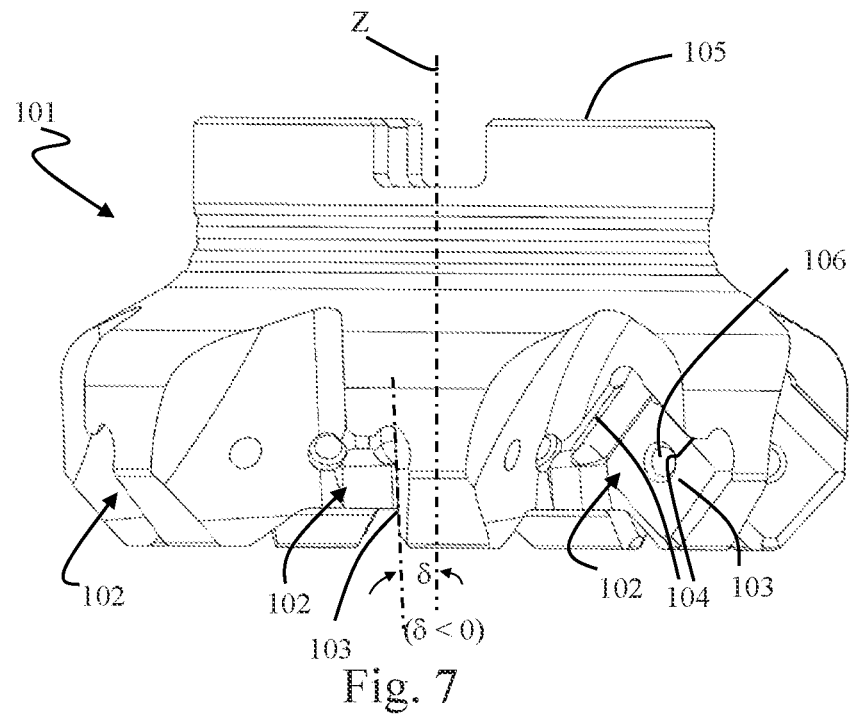
FIG. 7: a schematic, side view of a base body of a milling tool according to one embodiment, viewed perpendicularly to a rotational axis of the milling tool.

As FIG. 7 in particular shows, each seat 102 has a main support surface 103 which is configured to support one of the main contact surfaces 26 of the double-sided cutting insert 1. The seat 102 furthermore has a plurality of lateral support surfaces 104 which are configured to support the main clearance surfaces 22 of the cutting insert 1. The lateral support surfaces 104 are configured to support the main clearance surfaces 22 associated with the bottom side 4 of the cutting insert 1 when the main contact surface 26 of the top side 2 rests on the main support surface 103 of the seat, and vice versa. The negative nominal main clearance angle ε thus provides a form-fit component for fixing the cutting insert 1 to the seat 102. Each seat 102 has a threaded bore 106 for receiving a thread portion of the fixing bolt 200, by means of which the double-sided cutting insert 1 may be attached to the seat 102.

FIG. 7 shows a side view of the base body 101 viewed perpendicularly to the rotational axis Z of the base body 101 and perpendicularly to a surface normal of the main support surface 103 of a seat 102. As FIG. 7 shows, the main support surface 103 is oriented such that it extends at a negative axial installation angle δ. The axial installation angle δ is the angle which the main support surface 103 encloses with the rotational axis Z of the base body 101, when viewed perpendicularly to the rotational axis Z and perpendicularly to the surface normal of the main support surface 103. The main support surface 103 is thus tilted slightly forward in the rotational direction with respect to the rotational axis Z of the metal base body 101 or milling tool 100. In the embodiment shown, the axial installation angle δ is selected such that it lies in a range from −1° to −5°, preferably in a range from −2° to −4°. The axial installation angle δ in the embodiment shown is thus negative, which allows reliable protection of the inactive secondary cutters 14 and main cutters 12. On the other hand, the axial installation angle δ is however selected only very slightly negative, which has a highly advantageous effect on the orientation of the active main cutter 12, as will be described in more detail below.

Figure 8:
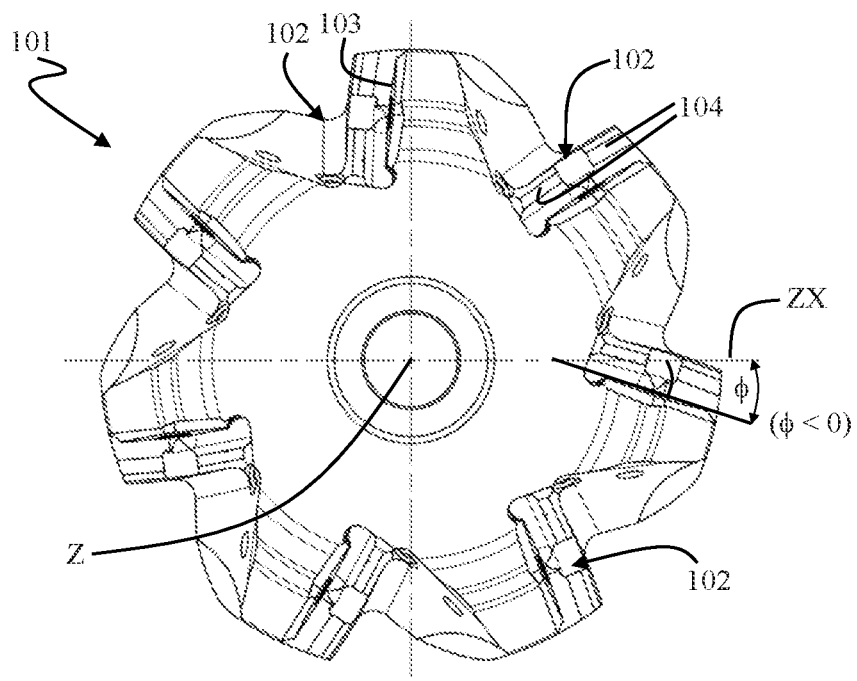
FIG. 8: a schematic, end view of the base body from FIG. 7, viewed along the rotational axis.
Figure 10:
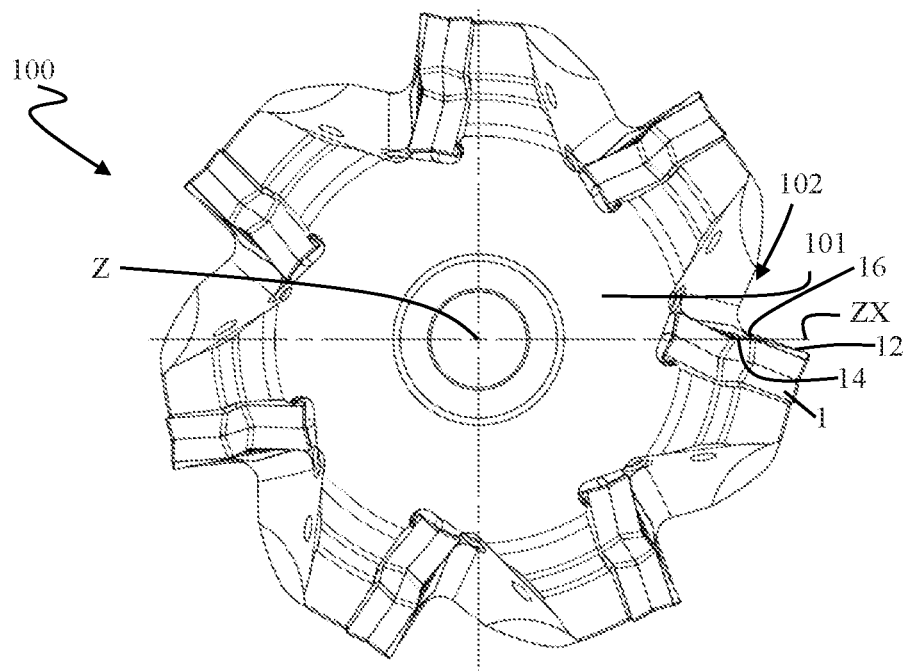
FIG. 10: a schematic, end view of the milling tool from FIG. 9, viewed along the rotational axis.

The main support surface 103 is furthermore arranged such that it extends at a negative radial installation angle φ, as shown in particular in FIG. 8. In the installed state of a cutting insert 1 on a seat 102, the rotational axis Z of the milling tool 100 and the active raised cutting corner 16, i.e. the raised cutting corner 16 situated between the active main cutter 12 and the active secondary cutter 18, of the cutting insert 1 attached to the seat 102, span a plane ZX, as shown in FIG. 10 using the example of the plate seat 102 shown on the right. The radial installation angle φ is here measured for this seat 102 between the main support surface 103 and this plane ZX, as shown in FIG. 8. The main support surface 103 is thus tilted to the rear relative to the radial direction. In the embodiment shown, the radial installation angle φ is selected such that it lies in a range from −15° to −21°, preferably in a range from −17° to −19°. The radial installation angle φ is thus also negative in the embodiment shown, but significantly more greatly negative, i.e. smaller, than the axial installation angle δ. The radial installation angle φ in the embodiment shown is at least 10° smaller than the axial installation angle δ, preferably it may be at least 15° smaller.

Figure 9:
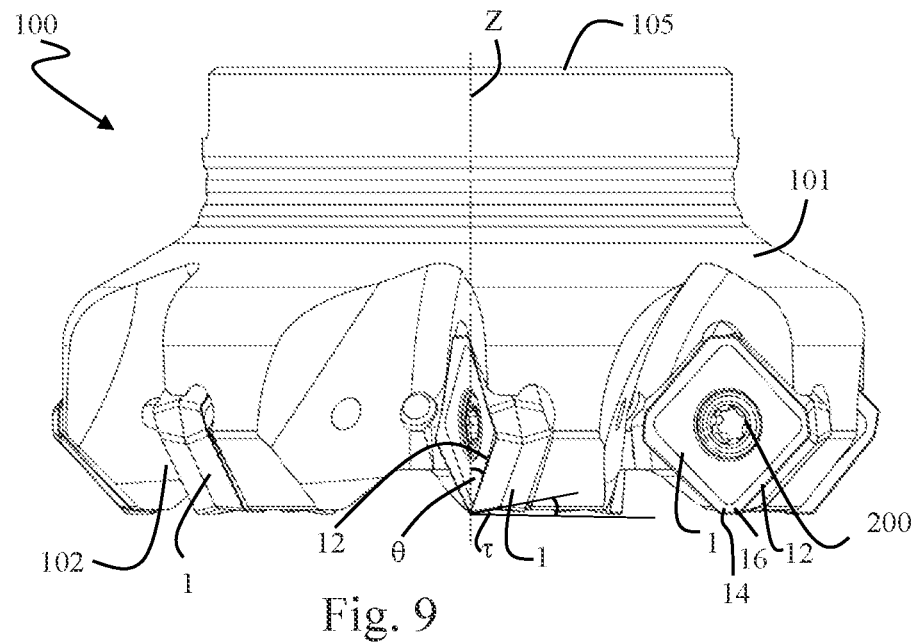
FIG. 9: a schematic, side view of a milling tool according to an embodiment with mounted cutting inserts, viewed perpendicularly to the rotational axis of the milling tool.
Figure 11:
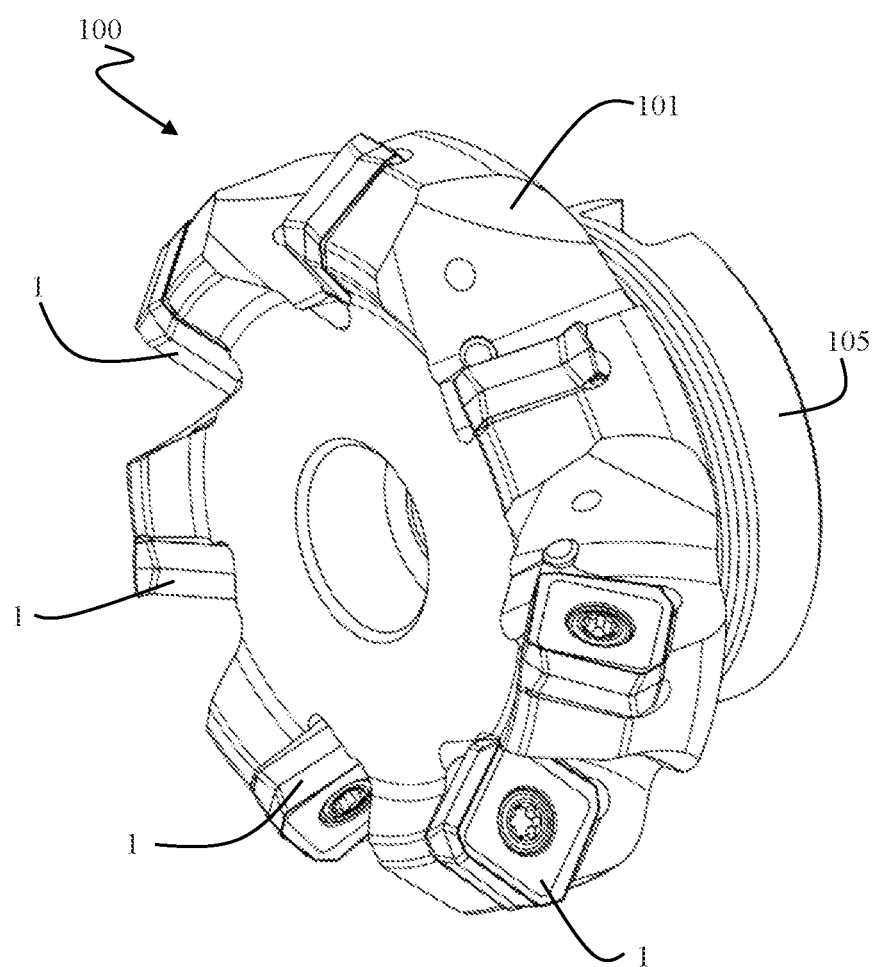
FIG. 11: a schematic, perspective view of the milling tool.

Now with reference to FIG. 9 to FIG. 11, the milling tool 100 is described which results if at least one cutting insert 1 is attached to a seat 102 of the base body 101. The resulting orientation of the cutting edges is described below using the example of the seat 102 with a cutting insert 1 attached thereto, and it is understood that the situation is similar for cutting inserts 1 attached to the other seats 102.

The cutting insert 1 is attached to the seat 102 with a fixing bolt 200 such that a main contact surface 26 (either the top side 2 or bottom side 4) rests on the main support surface 103 of the seat 102, and two main clearance surfaces 22 rest on the lateral support surfaces 104.

In this installation situation, a face cutter 14 of the cutting insert 1 is oriented such that it protrudes from the base body 101 in the axial direction. The face cutter 14 here extends substantially in a plane perpendicular to the rotational axis Z of the base body 101, as shown in FIG. 9. Radially outwardly with respect to the rotational axis Z, a main cutter 10 is connected to this face cutter 14 via a raised cutting corner 16. This face cutter 14 and the main cutter 12, connected therewith via the raised cutting corner 16, form an active face cutter 14 and an active main cutter 12, which are arranged such that they come into engagement with the material to be machined. The other face cutters 14 and main cutters 12 form "inactive" face cutters and main cutters which do not come into engagement with the material to be machined, and may come to be used by means of indexing when the active face cutting portion is worn away.

Due to the combination of the above-described nominal angles and courses of the individual surfaces implemented on the cutting insert 1 itself, with the angles and orientations imposed by the orientation of the seat 102, in the embodiment shown a particularly advantageous and effective arrangement is achieved of the active main cutter 12 and active secondary cutter 14 relative to the workpiece to be machined. This is explained in more detail below with reference to FIG. 9 and FIG. 10.

In the installed state, the active main cutter 12 extends at a very great effective axial angle θ, as shown in particular in FIG. 9. In the embodiment shown, the effective axial angle θ lies in the range from 16°-24°, preferably in the range from 18°-22°. This allows a particularly gentle cut in face milling. The effective axial angle θ is here determined between the active main cutter 12 and the rotational axis Z of the milling cutter 100, viewed in the radial direction in which the rotational axis Z intersects the end of the active main cutter 12 adjoining the raised cutting corner 16.

In the installed state, the effective face clearance angle τ formed on the active face cutter 14, as shown in particular in FIG. 9, lies in the range from 8°-12°. Because of the greatly negative radial installation position, the effective main clearance angle formed at the active main cutter 12 also lies in the range from 8°-12°. Preferably, for example the effective face clearance angle and effective main clearance angle may be substantially the same. The effective main clearance angle is measured between the main clearance surface 22 associated with the active main cutter 12 and the envelope curve which is generated by the main cutter 12 on rotation of the milling tool 100 about the rotational axis Z.

Because of the combination of the above-described embodiment of the face rake surface chamfer 34 with its nominal chamfer angle achieved at the cutting insert 1, the main rake surface chamfer 32 with its nominal chamfer angle achieved at the cutting insert, and the installation position which is tilted both axially and radially, in the installed state an effective chamfer angle of the face rake surface chamfer 34 and an effective chamfer angle of the main rake surface chamfer 32 are substantially the same size.

The described combination of features ensures that despite the restrictions imposed on the production of a cutting insert as a double-sided cutting insert of the arrangement, on face milling a very gentle cut and a particularly stable milling process are achieved.

The invention claimed is:

1. A milling tool, comprising:
   a base body formed with at least one seat for receiving a cutting insert; and
   at least one cutting insert arranged on said at least one seat, said cutting insert having:
   a top side, a bottom side, and a circumferential lateral surface between said top and bottom sides;
   a first cutting edge formed at a transition from said top side to said circumferential lateral surface;
   a second cutting edge formed at a transition from said bottom side to said circumferential lateral surface;
   an axis of symmetry relative to which the cutting insert has a fourfold rotational symmetry; and
   a reference plane running perpendicularly to said axis of symmetry and dividing said cutting insert into two halves;
   each of said first cutting edge and said second cutting edge having:
   alternately arranged main cutters and face cutters, each extending between raised cutting corners and lowered cutting corners, wherein said lowered cutting corners are closer to said reference plane than said raised cutting corners;
   said circumferential lateral surface having face clearance surfaces each extending along said face cutter and coming closer to said axis of symmetry as a distance from the associated said face cutter increases; and
   said circumferential lateral surface having main clearance surfaces extending along said main cutter and moving farther away from said axis of symmetry as the distance from the associated said main cutter increases;
   said at least one seat of said main body having a main support surface for supporting a main contact surface of said cutting insert extending parallel to the reference plane, and said main support surface extending at a negative axial installation angle and at a negative radial installation angle; and
   the radial installation angle being at least 10° smaller than the axial installation angle.

2. The milling tool according to claim 1, wherein the cutting insert has, in a plan view onto said top side, a substantially square base form with angled corners, said main cutters extend along main sides of the square base form and said face cutters extend along the angled corners.

3. The milling tool according to claim 1, wherein each of said first cutting edge and said second cutting edge are formed by four main cutters and four face cutters which are connected together via said raised cutting corners and said lowered cutting corners.

4. The milling tool according to claim 1, wherein each of said main cutters, viewed in a plan view onto said top side or onto said bottom side, has an internal angle in a range between 130° and 140° with the adjacent said face cutters.

5. The milling tool according to claim 1, wherein each of said face clearance surfaces extends as a flat surface along an entire said face cutter from a respective said raised cutting corner to a respective said lowered cutting corner.

6. The milling tool according to claim 1, wherein each of said main clearance surfaces extends as a flat surface along an entire said main cutter from a respective said raised cutting corner to a respective said lowered cutting corner.

7. The milling tool according to claim 1, wherein each of said top side and said bottom side is formed with a main rake surface chamfer adjacent said main cutters and with a face rake surface chamfer adjacent said face cutters.

8. The milling tool according to claim 7, wherein a nominal chamfer angle of said face rake surface chamfer is smaller than a nominal chamfer angle of said main rake surface chamfer.

9. The milling tool according to claim 8, wherein the nominal chamfer angle of said face rake surface chamfer is at least 8° smaller than the nominal chamfer angle of said main rake surface chamfer.

10. The milling tool according to claim 9, wherein the nominal chamfer angle of said face rake surface chamfer is at least 10° smaller than the nominal chamfer angle of said main rake surface chamfer.

11. The milling tool according to claim 1, wherein the radial installation angle is at least 15° smaller than the axial installation angle.

12. The milling tool according to claim 1, wherein the axial installation angle lies in a range from −1° to −5°.

13. The milling tool according to claim 1, wherein the radial installation angle lies in a range from −15° to −21°.

14. The milling tool according to claim 1, wherein the axial installation angle lies in a range from −2° to −4° and the radial installation angle lies in a range from −17° to −19°.

15. The milling tool according to claim 1, wherein said at least one cutting insert is arranged such that an active main cutter extends at an effective axial angle in a range from 16° to 24°.

16. The milling tool according to claim 1, wherein the active main cutter extends at an effective axial angle in a range from 18° to 22°.

17. The milling tool according to claim 1, wherein said at least one cutting insert is arranged such that an effective main clearance angle formed at the active main cutter lies in a range from 8° to 12° and the effective face clearance angle formed at the active face cutter lies in a range from 8° to 12°.

18. The milling tool according to claim 1, wherein said at least one cutting insert is formed with a face rake surface chamfer and with a main rake surface chamfer, and is arranged such that, in an installed state, an effective chamfer angle of the face rake surface chamfer and an effective chamfer angle of the main rake surface chamfer are substantially equal to one another.

19. A milling tool, comprising:
   a base body formed with at least one seat for receiving a cutting insert; and
   at least one cutting insert arranged on said at least one seat, said at least one cutting insert having:
   a top side, a bottom side, and a circumferential lateral surface between said top and bottom sides;

a first cutting edge formed at a transition from said top side to said circumferential lateral surface;
a second cutting edge formed at a transition from said bottom side to said circumferential lateral surface;
an axis of symmetry relative to which the cutting insert has a fourfold rotational symmetry; and
a reference plane running perpendicularly to said axis of symmetry and dividing said cutting insert into two halves;
each of said first cutting edge and said second cutting edge having:
alternately arranged main cutters and face cutters, each extending between raised cutting corners and lowered cutting corners, wherein said lowered cutting corners are closer to said reference plane than said raised cutting corners;
said circumferential lateral surface having face clearance surfaces each extending along said face cutter and coming closer to said axis of symmetry as a distance from the associated said face cutter increases; and
said circumferential lateral surface having main clearance surfaces extending along said main cutter and moving farther away from said axis of symmetry as the distance from the associated said main cutter increases;
said at least one cutting insert being arranged such that an effective main clearance angle formed at the active main cutter lies in a range from 8° to 12° and the effective face clearance angle formed at the active face cutter lies in a range from 8° to 12°.

20. A milling tool, comprising:
a base body formed with at least one seat for receiving a cutting insert; and
at least one cutting insert arranged on said at least one seat, said at least one cutting insert having:
a top side, a bottom side, and a circumferential lateral surface between said top and bottom sides;
a first cutting edge formed at a transition from said top side to said circumferential lateral surface;
a second cutting edge formed at a transition from said bottom side to said circumferential lateral surface;
an axis of symmetry relative to which the cutting insert has a fourfold rotational symmetry; and
a reference plane running perpendicularly to said axis of symmetry and dividing said cutting insert into two halves;
each of said first cutting edge and said second cutting edge having:
alternately arranged main cutters and face cutters, each extending between raised cutting corners and lowered cutting corners, wherein said lowered cutting corners are closer to said reference plane than said raised cutting corners;
said circumferential lateral surface having face clearance surfaces each extending along said face cutter and coming closer to said axis of symmetry as a distance from the associated said face cutter increases; and
said circumferential lateral surface having main clearance surfaces extending along said main cutter and moving farther away from said axis of symmetry as the distance from the associated said main cutter increases;
said at least one cutting insert being formed with a face rake surface chamfer and with a main rake surface chamfer, and being arranged such that, in an installed state, an effective chamfer angle of the face rake surface chamfer and an effective chamfer angle of the main rake surface chamfer are substantially equal to one another.

* * * * *